United States Patent
Joo et al.

(10) Patent No.: US 9,553,305 B2
(45) Date of Patent: Jan. 24, 2017

(54) ANODE ACTIVE MATERIAL, ANODE AND LITHIUM BATTERY CONTAINING THE SAME, AND PREPARATION METHOD THEREOF

(75) Inventors: Kyu-Nam Joo, Yongin-si (KR);
Tae-Sik Kim, Yongin-si (KR);
Deok-Hyun Kim, Yongin-si (KR);
Jae-Myung Kim, Yongin-si (JP)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 807 days.

(21) Appl. No.: 13/354,999

(22) Filed: Jan. 20, 2012

(65) Prior Publication Data

US 2012/0258361 A1   Oct. 11, 2012

(30) Foreign Application Priority Data

Apr. 7, 2011   (KR) .......................... 10-2011-0032145

(51) Int. Cl.
| | | |
|---|---|---|
| *H01M 4/134* | (2010.01) |
| *B05D 5/12* | (2006.01) |
| *H01M 4/36* | (2006.01) |
| *H01M 4/48* | (2010.01) |
| *H01M 4/62* | (2006.01) |
| *H01M 4/1395* | (2010.01) |
| *H01M 4/46* | (2006.01) |
| *H01M 4/38* | (2006.01) |

(52) U.S. Cl.
CPC ............... *H01M 4/366* (2013.01); *H01M 4/48* (2013.01); *H01M 4/626* (2013.01); *H01M 4/134* (2013.01); *H01M 4/1395* (2013.01); *H01M 4/387* (2013.01); *H01M 4/46* (2013.01)

(58) Field of Classification Search
CPC ........ H01M 4/366; H01M 4/48; H01M 4/626; H01M 4/134; H01M 4/1395; H01M 4/387; H01M 4/46
USPC ..................................... 429/218.1, 123, 125
See application file for complete search history.

(56) References Cited

U.S. PATENT DOCUMENTS

| | | | |
|---|---|---|---|
| 6,902,845 B2 | 6/2005 | Tani et al. | |
| 2003/0118905 A1 | 6/2003 | Fukuoka et al. | |
| 2005/0031958 A1* | 2/2005 | Fukuoka ............... | H01M 4/366 429/218.1 |

(Continued)

FOREIGN PATENT DOCUMENTS

| | | |
|---|---|---|
| JP | 2003-308837 | 10/2003 |
| JP | 2004-063433 | 2/2004 |

(Continued)

OTHER PUBLICATIONS

Anode properties of thick-film electrodes prepared by gas deposition of Ni-Coated Si Particles. Journal of Power Sources 196 (2011) 2143-2148 by Sakaguchi et al.*

(Continued)

*Primary Examiner* — Milton I Cano
*Assistant Examiner* — Michael Dignan
(74) *Attorney, Agent, or Firm* — Robert E. Bushnell, Esq.

(57) ABSTRACT

An anode active material. The anode active material includes a core including $SiO_x$ ($0.5 \leq x \leq 1.7$), and a coating layer formed on the core at least partially. The coating layer includes metal unreactive toward lithium.

17 Claims, 4 Drawing Sheets

(56) References Cited

U.S. PATENT DOCUMENTS

| | | |
|---|---|---|
| 2005/0233213 A1 | 10/2005 | Lee et al. |
| 2006/0051675 A1 | 3/2006 | Musha et al. |
| 2008/0118834 A1 | 5/2008 | Yew et al. |
| 2009/0011333 A1 | 1/2009 | Wakita et al. |
| 2010/0075227 A1 | 3/2010 | Morita et al. |
| 2011/0097629 A1 | 4/2011 | Yew et al. |
| 2011/0159368 A1 | 6/2011 | Hirose et al. |
| 2011/0159370 A1* | 6/2011 | Inaba et al. ............ 429/231.1 |
| 2011/0165465 A1 | 7/2011 | Kim et al. |
| 2012/0321949 A1 | 12/2012 | Kawakami et al. |

FOREIGN PATENT DOCUMENTS

| | | | |
|---|---|---|---|
| JP | 2005-063767 A | 3/2005 | |
| JP | 2005-259697 A | 9/2005 | |
| JP | 2008-098151 | 4/2008 | |
| JP | 2008-210618 | 9/2008 | |
| JP | 2009-16245 A | 1/2009 | |
| JP | 2010-73651 A | 4/2010 | |
| KR | 2005-0102871 A | 10/2005 | |
| KR | 10-2010-0063747 A | 6/2010 | |
| WO | WO2013/024688 * | 2/2013 | ............ H01M 4/48 |

OTHER PUBLICATIONS

"Electroless nickel deposition on amino-functionalized silica spheres." Surface & Coating Technology 200 (2005) 2249-2252 by Tang et al.*

"Nano-porous SiO/carbon composite anode for lithium-ion batteries." J Appl Electrochem (2009) 39:1643-1649 by Liu et al.*

"The synthesis of nickel nanoparticles with controlled morphology and $SiO_2$/Ni core-shell structures." Materials Chemistry and Physics 114 (2009) 902-907 by Zhang et al. available Oct. 2008.*

"Review on recent progress of nanostructured anode materials for Li-ion batteries." Journal of Power Sources 257 (2014) 421-443 by Goriparti et al. available Nov. 2013.*

Usui et al. "Anode Properties of Cu-Coated Si Thick Film Electrodes Prepared by Electroless Deposition and Gas-Deposition." Electrochemistry vol. 78, pp. 329-331 (published May 2010).*

* cited by examiner

ANODE ACTIVE MATERIAL, ANODE AND LITHIUM BATTERY CONTAINING THE SAME, AND PREPARATION METHOD THEREOF

CLAIM OF PRIORITY

This application makes reference to, incorporates the same herein, and claims all benefits accruing under 35 U.S.C. §119 from an application earlier filed in the Korean Intellectual Property Office on the 7 Apr. 2011 and there duly assigned Serial No. 10-2011-0032145.

BACKGROUND OF THE INVENTION

Field of the Invention

The present disclosure relates to an anode active material, an anode and a lithium battery including the same, and a method of manufacturing the same.

Description of the Related Art

A lithium battery is constructed with an anode electrode including an anode active material.

SUMMARY OF THE INVENTION

One or more embodiments of the present invention include an improved anode active material and an improved lithium battery including an anode made of the anode active material.

One or more embodiments of the present invention include an anode active material including a silicon oxide coated with metal which is unreactive toward lithium.

One or more embodiments of the present invention include an anode including the anode active material.

One or more embodiments of the present invention include a lithium battery including the anode.

Additional aspects will be set forth in part in the description which follows and, in part, will be apparent from the description, or may be learned by practice of the presented embodiments.

According to one or more embodiments of the present invention, an anode active material includes a core including $SiO_x$ (0.5≤x≤1.7); and a coating layer formed on the core at least partially. The coating layer includes metal unreactive toward lithium.

According to one or more embodiments of the present invention, an anode may include the anode active material.

According to one or more embodiments of the present invention, a lithium battery may include the anode.

According to one or more embodiments of the present invention, a method of manufacturing an anode active material includes forming a coating layer including metal unreactive toward lithium on $SiO_x$ (0.5≤x≤1.7) powder.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
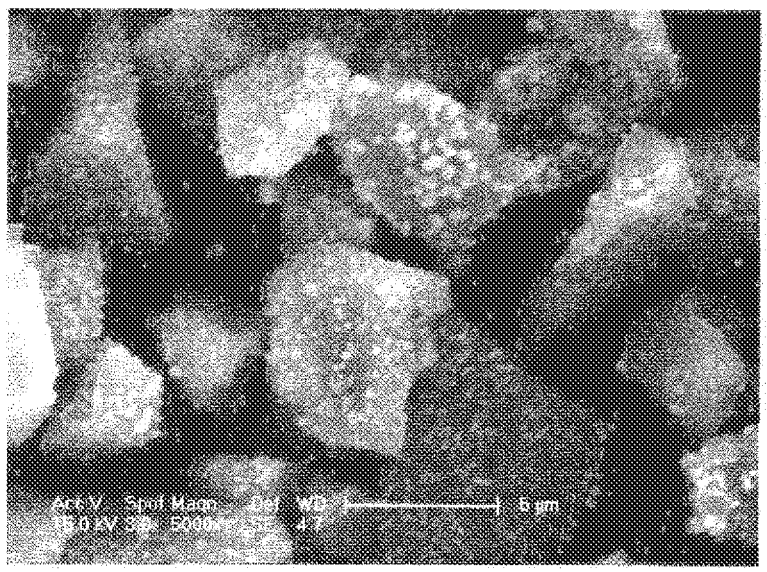
FIG. 1 is a Scanning Electron Microscope (SEM) image of anode active material powder manufactured in Example 1 as an embodiment according to the principles of the present invention.

A representative example of an anode material for a lithium battery is a carbon material such as graphite. Graphite has excellent capacity retention characteristics and voltage characteristics, and a volume of graphite is little changed during intercalating lithium. Thus, the stability of a battery using graphite is high. A theoretical electric capacity of graphite is about 372 mAh/g and an irreversible capacity is high.

Metal alloyable with lithium may be used as an anode active material which has a high electric capacity in comparison with the carbon material. For instance, the metal alloyable with lithium is silicon (Si), tin (Sn), aluminum (Al), etc. The metal alloyable with lithium has a very high capacity. The metal alloyable with lithium accompanies a volume expansion during a charging/discharging operation, and thus an active material isolated in an electrode is generated and electrolyte decomposition reaction due to an increase in specific surface area of the expanded active material is intensified. A lithium battery including the metal alloyable with lithium has deteriorated capacity retention characteristics of the lithium battery. For instance, in the case of Sn, aggregation and fragmentation of Sn particles are repeated as a charging/discharging operation is repeated, and thus Sn particles are electrically isolated.

A metal oxide has a lower volume expansion rate in comparison with metal; however, life characteristics are poor. For instance, $SiO_a$ (0<a<2) has high irreversible capacity and poor life characteristics.

Therefore, a lithium battery, which uses metal oxides but provides improved life characteristics is needed.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, an anode active material, an anode including the same, a lithium battery adopting the anode, and a method of manufacturing the anode active material as exemplary embodiments according to the principles of the present invention will be described in detail.

An anode active material constructed as an embodiment according to the principles of the present invention includes a core including $SiO_x$ (0.5≤x≤1.7>, and a coating layer formed on at least a portion of the core. The coating layer includes metal unreactive toward lithium. In one embodiment according to the principles of the present invention, x in $SiO_x$ may be about 0.7 to about 1.3. In another embodiment according to the principles of the present invention, x in $SiO_x$ may be about 0.9 to about 1.2.

In the Detailed Description of the present application and the claims, the term "metal unreactive toward lithium" means metal which is not capable of alloy formation with lithium. That is, the metal unreactive toward lithium is not alloyed with lithium and exists as a separate phase structurally differentiated from lithium.

Because a coating layer of metal not alloyed with lithium is formed on at least a portion of a silicon oxide surface, conductivity of the anode active material is improved. By virtue of the improved conductivity, discharge capacity and life characteristics of a lithium battery including the anode active material may be improved.

In the anode active material, the coating layer may be uniformly distributed in the form of at least one island on the core. The coating layer of island form is confirmed from FIG. 1. Because the coating layer is formed in the form of islands on the core, lithium ions may easily move, and cracks in the coating layer may be suppressed regardless of a volume change of the core.

Also, because the coating layer is easily fabricated without other device in comparison with a typical carbon coating layer, price competitiveness for mass production is high. Therefore, industrial applicability is high.

Content of the metal unreactive toward lithium may be about 5 wt % to about 30 wt % on a basis of a total weight of the anode active material. For instance, the content of the metal unreactive toward lithium may be about 7 wt % to about 15 wt % on a basis of a total weight of the anode active material. The content of the metal unreactive toward lithium may be about 7 wt % to about 10 wt % on a basis of a total weight of the anode active material. When the content of the metal unreactive toward lithium is excessively low, life characteristics of a lithium battery may degrade, and when the metal content is excessively high, an initial capacity may be lowered.

The metal unreactive toward lithium in the anode active material may be one or more selected from a group consisting of nickel (Ni), copper (Cu), iron (Fe), titanium (Ti), phosphorus (P), and an alloy thereof. It is not limited thereto, however, and any metal which is not alloyed with lithium and has excellent conductivity may be used.

In the anode active material, the coating layer may further include metal alloyable with lithium, i.e., is able to be alloyed with lithium. The metal alloyable with lithium may be one or more selected from a group consisting of silver (Ag), aluminum (Al), tin (Sn), and an alloy thereof.

In the anode active material, the $SiO_x$ (0.5≤x≤1.7) may be amorphous or has low crystallinity. In the present specification, the amorphous or low-crystallinity SiOx refers to a SiOx which is not heat treated at a temperate higher than about 400° C. For instance, the coating layer of the anode active material may only undergo a low temperature heat treatment at a temperature lower than about 400° C. without the same treatment at a temperature higher than 400° C. after being formed using a wet method. Therefore, crystallization of SiOx, which occurs during a high temperature heat treatment at a temperature higher than about 800° C., may be suppressed or may not occur. Therefore, cracks in the SiOx crystal generated during a charging/discharging process may be suppressed, and an increase in an internal resistance due to the crack may also be suppressed. As a result, life characteristics of a lithium battery including the anode active material may be improved.

The average particle diameter (d50) of the anode active material may be about 1 μm to about 10 μm. For instance, the average particle diameter (d50) of the anode active material may be about 2 μm to about 10 μm. For instance, the average particle diameter (d50) of the anode active material may be about 3 μm to about 8 μm. When the average particle diameter is too small, it may be difficult to manufacture slurry of the anode active material, and when the average particle diameter is too large, it may be difficult to manufacture an active material layer with a uniform thickness.

Specific conductivity of the anode active material may be about 5 S/cm or more. For instance, specific conductivity of the anode active material may be about 5 S/cm to about 100 S/cm. For instance, specific conductivity of the anode active material may be about 5 S/cm to about 50 S/cm.

An anode constructed as another embodiment according to the principles of the present invention includes the anode active material described in the foregoing paragraphs. The anode may be manufactured, for example, by forming an anode active material composition including the anode active material and a binding agent in a certain shape, and applying the anode active material composition on a current collector such as a copper foil.

In detail, an anode active material composition in which the anode active material, a conducting agent, a binder (i.e., a binding agent), and a solvent are mixed is prepared. The anode active material composition is directly coated on a metal current collector to manufacture an anode plate. Alternatively, the anode active material composition may be casted on a separate support, and then a film peeled from the support may be laminated on a metal current collector to manufacture an anode plate. The anode active material is not limited to the above-described forms, and thus, may have other forms As the conducting agent, metal powder and metal fiber such as acetylene black, ketjen black, natural graphite, artificial graphite, carbon black, carbon fiber, copper, nickel, aluminum, and silver may be used, or one kind or a mixture of conducting materials such as polyphenylene derivatives may be used. The conducting material is not limited thereto, however, and any conducting agent used in the art may be used. Also, crystalline carbon material may be added as the conducting agent.

As the binder, vinylidene fluoride/hexafluoropropylene co-polymer, polyvinylidene fluoride (PVDF), polyacrylonitrile, poly(methyl methacrylate), polytetrafluoroethylene (PTFE), mixture of the foregoing polymers, or styrene butadiene rubber polymer may be used. The binder is not limited thereto, however, and any binder used in the art may be used.

As the solvent, N-methylpyrrolidone, acetone, or water may be used. The solvent is not limited thereto, however, and any material used in the art may be used.

Contents of the anode active material, the conducting agent, the binder, and the solvent may be typical amounts used for a lithium battery. According to use and structure of a lithium battery, one or more of the conducting agent, the binder, and the solvent may be omitted.

A lithium battery constructed as another embodiment according to the principles of the present invention adopts an anode including the anode active material. The lithium battery may be manufactured using a method described below.

Firstly, an anode is prepared according to the above-mentioned anode manufacturing method.

Next, a cathode active material composition in which a cathode active material, a conducting agent, a hinder, and a solvent are mixed is prepared. The cathode active material composition may be directly coated on a metal current collector to manufacture a cathode plate. Alternatively, the cathode active material composition may be casted on a separate support, and then a film peeled from the support may be laminated on a metal current collector to manufacture a cathode plate.

The cathode active material may include one or more selected from a group consisting of lithium cobalt oxide, lithium nickel cobalt manganese oxide, lithium nickel cobalt aluminum oxide, lithium iron phosphorus oxide, and lithium manganese oxide. The cathode active material is not limited thereto, however, and any cathode active material used in the art may be used.

For instance, the cathode active material may include a compound expressed as one of chemical formulas $Li_aA_{1-b}B_bD_2$ (where, $0.90 \le a \le 1.8$, and $0 \le b \le 0.5$); $L_aE_{1-b}B_bO_{2-c}D_c$ (where, $0.90 \le a \le 1.8$, $0 \le b \le 0.5$, $0 \le c \le 0.05$); $L_fE_{2-b}B_bO_{4-c}D_c$ (where, $0 \le b \le 0.5$, $0 \le c \le 0.05$); $Li_aNi_{1-b-c}Co_bB_cD_\alpha$ (where, $0.90 \le a \le 1.8$, $0 \le b \le 0.5$, $0 \le c \le 0.05$, $0 < \alpha \le 2$); $Li_aNi_{1-b-c}Co_bB_cO_{2-\alpha}F_\alpha$ (where, $0.90 \le a \le 1.8$, $0 \le b \le 0.5$, $0 \le c \le 0.05$, $0 < \alpha < 2$); $Li_aNi_{1-b-c}Co_bB_cO_{2-\alpha}F_2$ (where, $0.90 \le a \le 1.8$, $0 \le b \le 0.5$, $0 \le c \le 0.05$, $0 < \alpha < 2$); $Li_aNi_{1-b-c}Mn_bB_cD_\alpha$ (where, $0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_\alpha$ (where, $0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_2$ (where, $0.90 \le a \le 1.8$, $0 \le b \le 0.5$, $0 \le c \le 0.05$, $0 < \alpha < 2$); $Li_aNi_bE_cG_dO_2$ (where, $0.90 \le a \le 1.8$, $0 \le b \le 0.9$, $0 \le c \le 0.5$, $0.001 \le d \le 0.1$); $Li_aNi_bCo_cMn_dG_eO_2$ (where, $0.90 \le a \le 1.8$, $0 \le b \le 0.9$, $0 \le c \le 0.5$, $0 \le d \le 0.5$, $0.001 \le e \le 0.1$); $Li_aNiG_bO_2$ (where, $0.90 \le a \le 1.8$, $0.001 \le b \le 0.1$); $Li_aCoG_bO_2$ (where, $0.90 \le a \le 1.8$, $0.001 \le b \le 0.1$); $Li_aMnG_bO_2$ (where, $0.90 \le a \le 1.8$, $0.001 \le b \le 0.1$); $Li_aMn_2G_bO_4$ (where, $0.90 \le a \le 1.8$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulas, A is nickel (Ni), cobalt (Co), Manganese (Mn), or a combination thereof; B is Al, Ni, Co, Mn, Chromium (Cr), Fe, magnesium (Mg), strontium (Sr), vanadium (V), a rare earth element, or a combination thereof; D is oxygen (O), fluorine (F), sulfur (S), P, or a combination thereof; F is F, S, P, or a combination thereof; G is Al, Cr, Mn, Fe, Mg, lanthanum (La), cerium (Ce), Sr, V, or a combination thereof; Q is Ti, molybdenum (Mo), Mn, or a combination thereof; I is Cr, V, Fe, scandium (Sc), yttrium (Y), or a combination thereof; and J is V, Cr, Mn, Co, Ni, Cu, or a combination thereof.

A material having a coating layer on a surface of the compound may also be used for forming the cathode active material. Alternatively, the compound and the material having a coating layer may be mixed to be used. The coating layer may include a coating element compound such as an oxide and a hydroxide of a coating element, an oxyhydroxide of a coating element, an oxycarbonate of a coating element, or a hydroxycarbonate of a coating element. The compounds constituting the coating layer may be amorphous or crystalline. As a coating element included in the coating layer, Mg, Al, Co, potassium (K), sodium (Na), calcium (Ca), Si, Ti, V, Sn, germanium (Ge), gallium (Ga), boron (B), arsenic (As), zirconium (Zr), or a combination thereof may be used. As a process for forming the coating layer, any kind of method (e.g., a spray coating method, a soaking method, or the like) may be used as long as properties of the cathode material are not deteriorated. Because this is well understood by those skilled in the art, detailed descriptions thereof are omitted.

For instance, $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \le x \le 0.5$, $0 \le y \le 0.5$), $LiFeO_2$, $V_2O_5$, $TiS$, and $MoS$ may be used as the compound for forming the cathode active material.

The same conducting agent, binder, and solvent as in the anode active material composition may be used for the cathode active material composition. A plasticizer may be added to the cathode active material composition and/or the anode active material composition to form pores within an electrode.

Contents of the cathode active material, the conducting agent, the binder, and the solvent may be typical amounts used for a lithium battery. According to use and structure of a lithium battery, one or more of the conducting agent, the binder, and the solvent may be omitted.

Next, a separator to be inserted between the cathode and the anode is prepared. Any separator typically used in a lithium battery may be used. A separator, which has low resistance to an ion movement of an electrolyte and has an excellent ability in impregnating an electrolyte solution, may be used. For instance, the separator may be selected from glass fiber, polyester, Teflon, polyethylene, polypropylene, PTFE, or a combination thereof, wherein the selected separator may be a non-woven fiber type or a woven fiber type separator. For instance, a windable separator such as polyethylene and polypropylene may be used in a lithium-ion battery, and a separator, which has an excellent ability in impregnating an organic electrolyte solution, may be used in a lithium-ion polymer battery. For instance, the separator may be manufactured as follows.

A separator composition is prepared by mixing a polymer resin, a filler, and a solvent. The separator composition may be directly coated on an electrode and dried for forming the separator. Alternatively, the separator composition may be casted on a support and dried, and then a separator film peeled from the support may be laminated on an electrode to form the separator.

The polymer resin used for manufacturing the separator is not particularly limited, and thus, any material used as a binder of an electrode plate may be used. For instance, vinylidene fluoride/hexafluoropropylene co-polymer, PVDF, polyacrylonitrile, poly(methyl methacrylate), or a combination thereof may be used.

Next, an electrolyte is prepared.

For instance, the electrolyte may be an organic electrolyte solution. Alternatively, the electrolyte may be a solid. For instance, the electrolyte may be a boron oxide or lithium oxynitride. It is not limited thereto, however, and any solid electrolyte used in the art may be used. The solid electrolyte may be formed on the anode using a sputtering method.

For instance, an organic electrolyte solution may be prepared. The organic electrolyte solution may be manufactured by dissolving lithium salt in an organic solvent.

Any organic solvent used in the art may be used as the organic solvent. For instance, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a combination thereof may be used.

Any lithium salt used in the art may be used as the lithium salt. For instance, $LiPF_6$, $LiBF_4$, $LiS_bF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, LiN($C_xF_{2x+1}SO_2$)($C_yF_{2y+1}SO_2$) (x and y are natural numbers), LiCl, LiI, or a combination thereof may be used.

Figure 4:
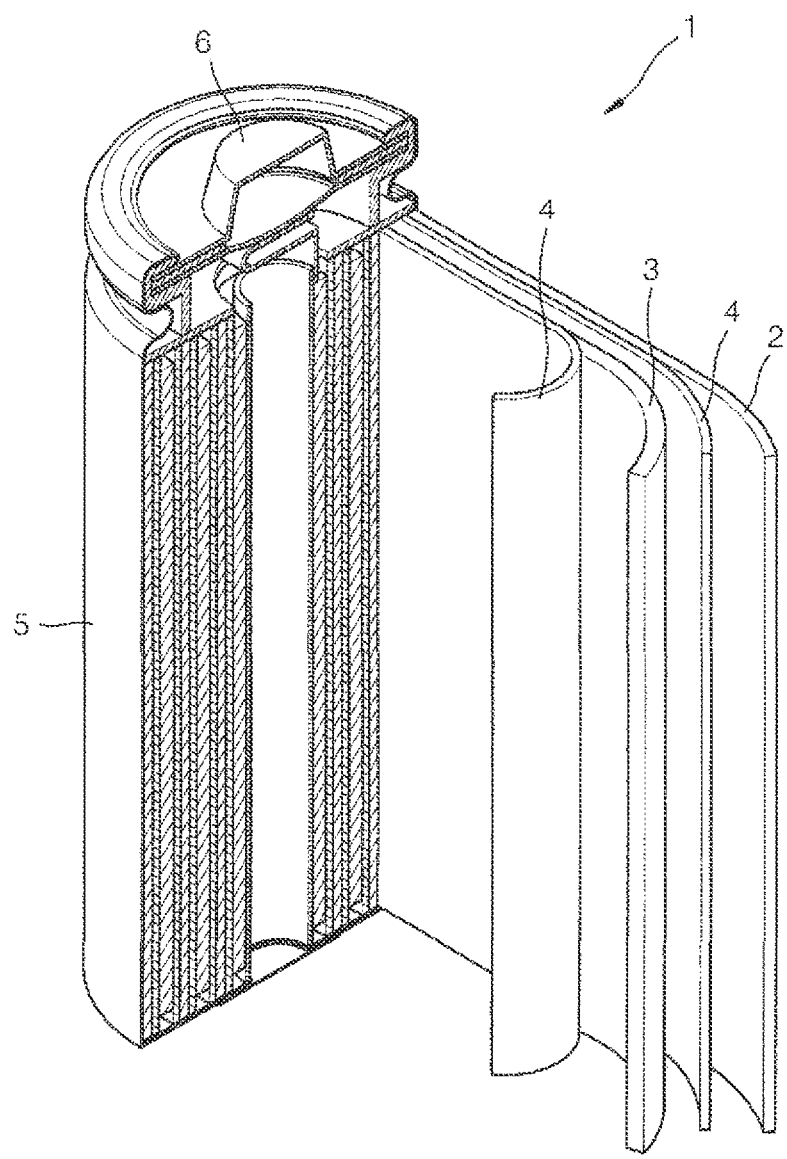
FIG. 4 is a mimetic diagram illustrating a lithium battery constructed as an exemplary embodiment according to the principles of the present invention.

As illustrated in FIG. 4, a lithium battery 1 constructed as an embodiment according to the principles of the present invention includes a cathode 3, an anode 2, and a separator 4. The cathode 3, anode 2, and separator 4 are wound or folded to be encased in a battery case 5. Thereafter, an organic electrolyte solution is injected into the battery case 5 and sealed by a cap assembly 6 for completing the lithium battery 1. The battery case 5 may have a cylindrical shape, a square shape, or a thin film shape. For instance, the lithium battery 1 may be a thin film type battery. The lithium battery 1 may be a lithium-ion battery.

The separator 4 may be disposed between the cathode 3 and the anode 2 to form an electrode assembly. The electrode assembly is layered as a bicell structure and is impregnated with an organic electrolyte solution, and then an obtained structure is accommodated in a pouch and is sealed to complete a lithium-ion polymer battery.

Also, a plurality of the electrode assembly may be layered for forming a battery pack, and the battery pack may be used in any high-capacity and high-output devices. For instance, the battery pack may be used in a notebook computer, a smartphone, and an electric vehicle.

A method of manufacturing an anode active material as another embodiment according to the principles of the present invention includes forming a coating layer, which includes metal unreactive toward lithium, on $SiO_x$ (0.5≤x≤1.7) powder.

The coating layer may be formed using a plating method. Without being limited to the plating method, however, any method capable of uniformly coating metal on the $SiO_x$ (0.5≤x≤1.7) powder in the form of an island may be used.

The plating method may be an electroless plating method. It is not limited thereto, however, and an electroplating method may also be used.

For instance, the electroless plating method may be performed by impregnating the $SiO_x$ (0.5≤x≤1.7) powder with a plating solution including a precursor of metal unreactive toward lithium. The $SiO_x$ (0.5≤x≤1.7) powder may be impregnated with the plating solution for less than about one hour. For instance, the impregnating time may be about 10 minutes to less than about 1 hour. For instance, the impregnating time may be about 10 minutes to about 40 minutes. For instance, the impregnating time may be about 15 minutes to about 30 minutes.

According to the anode active material manufacturing method as another embodiment according to the principles of the present invention, a catalyst nucleus may be formed on a surface of the $SiO_x$ (0.5≤x≤1.7) powder before the impregnation with the plating solution which includes metal unreactive toward lithium. Because the catalyst nucleus is densely formed on the surface of the $SiO_x$ (0.5≤x≤1.7) powder, electroless plating may be facilitated. The catalyst may be $PdC_{12}$, $H_2SO_4$, and $SnC_{12}$.

According to the anode active material manufacturing method as the embodiment according to the principles of the present invention, optionally the method may further include a step of heat-treating the $SiO_x$ (0.5≤x≤1.7) powder on which the coating layer is formed after the coating layer forming step.

According to the anode active material manufacturing method as the embodiment according to the principles of the present invention, the precursor of metal unreactive toward lithium may be one or more selected from a group consisting of $NiSO_4$, $CuSO_4$, $NiCl_2$, ammonium nickel sulfate (($NH_4$)$_2$$SO_4$$NiSO_4$), and nickel sulfamate (Ni($SO_3NH_2$)$_2$$4H_2O$)); however, it is not limited thereto and any material used in the art may be used.

According to the anode active material manufacturing method as the embodiment according to the principles of the present invention, the heat treatment may be performed at a temperature lower than about 400° C. For instance, the heat treatment may be performed at a temperate ranging from about 200° C. to about 400° C. For instance, the heat treatment may be performed at a temperate ranging from about 250° C. to about 350° C. For instance, the heat treatment may be performed for about 0.5 hours to about 1 hour. Because the heat-treatment is performed at a low temperature as described above, crystallization of the $SiO_x$ (0.5≤x≤1.7) powder may be suppressed or prevented.

According to the anode active material manufacturing method as the embodiment according to the principles of the present invention, a pellet composed of a mixture of Si and $SiO_2$ at a molar ratio of about 1:1 to about 6:1 may be vaporized at a temperature higher than about 1400° C., and then a precipitate educed on a substrate may be grinded to obtain the $SiO_x$ (0.5≤x≤1.7) powder. The method of obtaining the $SiO_x$ (0.5≤x≤1.7) powder, however, is not limited thereto and any method used in the art for manufacturing the $SiO_x$ (0.5≤x≤1.7) powder may be used.

The present disclosure will be described in detail through embodiments and comparative examples. However, embodiments are just for exemplifying the present disclosure, and thus, not limiting the scope of the present disclosure.

(Manufacturing Anode Active Material)

Example 1

Figure 5:
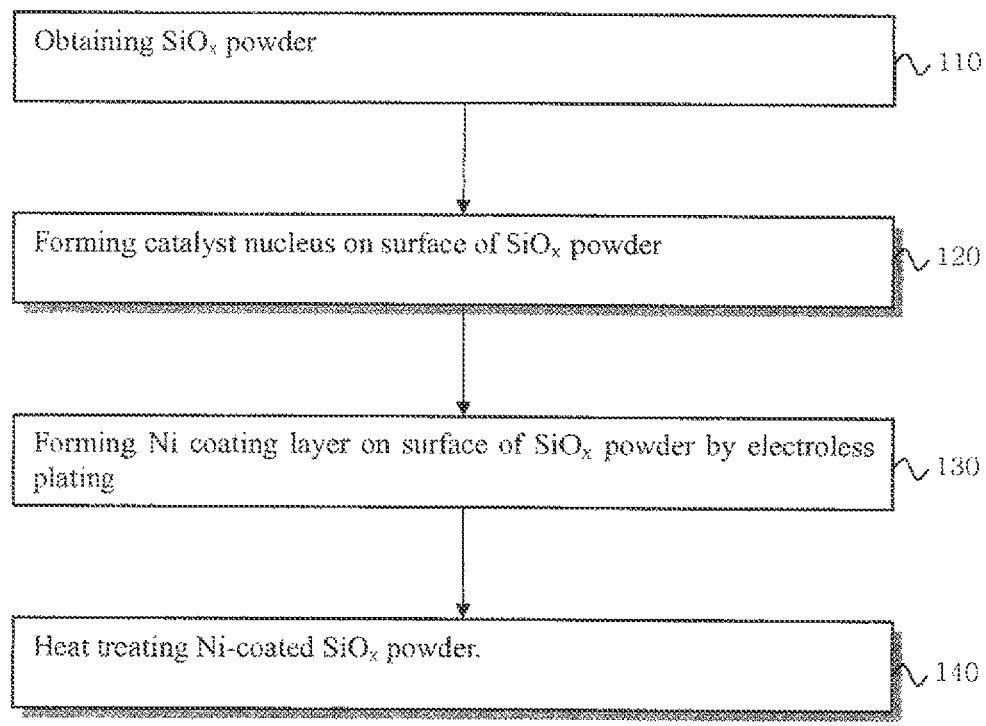
FIG. 5 is a flow chart of a process of manufacturing an anode active material as an embodiment according to the principles of the present invention.

FIG. 5 is a flow chart of a process Of manufacturing an anode active material as an embodiment according to the principles of the present invention. According to FIG. 5, in Example 1, Si and $SiO_2$ were mixed at a molar ratio of about 2:1, and then pressed to manufacture a pellet. The pellet was put into a crucible, and heated and vaporized at a temperature of about 1400° C. in argon (Ar) atmosphere to educe mixed gas onto a Stainless steel (SuS) substrate. The educed precipitate was collected and grinded to manufacture $SiO_x$ (x=0.95) powder having an average particle diameter (d50) of about 5 μm (step 110).

The $SiO_x$ powder was washed with water, and impregnated with a solution including $PdC_{12}$ and Pd catalysts (GSC Company) for about 20 seconds so that a Pd nucleus was densely formed on a surface of $SiO_x$ (step 120). Thereafter, the $SiO_x$ powder on which the Pd nucleus was formed was impregnated with a solution of 10% content of $H_2SO_4$ for about 10 seconds to activate the Pd coated $SiO_x$ surface. Thereafter, the $SiO_x$ powder of which the surface was activated was washed with water to pre-treat $SiO_x$. At each step, a filter paper was used to collect powder.

The pre-treated $SiO_x$ powder was impregnated with a plating solution for about 15 minutes and stirred to perform electroless plating and partially form a Ni coating layer on a surface of the $SiO_x$ powder (step 130). As the plating solution, Nipro 121 of GSC Company was used. The plating solution was an alkali solution and included nickel sulphate, sodium hypophosphite, sodium citrate, ammonium chloride, and water. The plating solution was heated to a temperature of about 35° C., and the pH value was adjusted to about 9 to 10 using ammonia water. Then, temperature was increased to about 45° C., and the $SiO_x$ powder was put into the plating water and stirred.

After completing the plating, the Ni-coated $SiO_x$ powder was washed with water, and dried at a temperature of about 80° C. for more than about 4 hours to manufacture an anode active material (step 140). A scanning electron microscope image of the manufactured anode active material is shown in FIG. 1.

An analysis using Ion Coupled Plasma (ICP) showed that content of the plated Ni was about 9 wt % on a basis of a total weight of the anode active material.

Example 2

The anode active material was manufactured using the same method as in Embodiment 1 except that the impregnation time with the plating solution was about 20 minutes.

Content of the plated Ni was about 11.6 wt % on a basis of a total weight of the anode active material.

Example 3

The anode active material was manufactured using the same method as in Embodiment 1 except that the impregnation time with the plating solution was about 25 minutes.

Content of the plated Ni was about 14.7 wt % on a basis of a total weight of the anode active material.

Example 4

Figure 2:
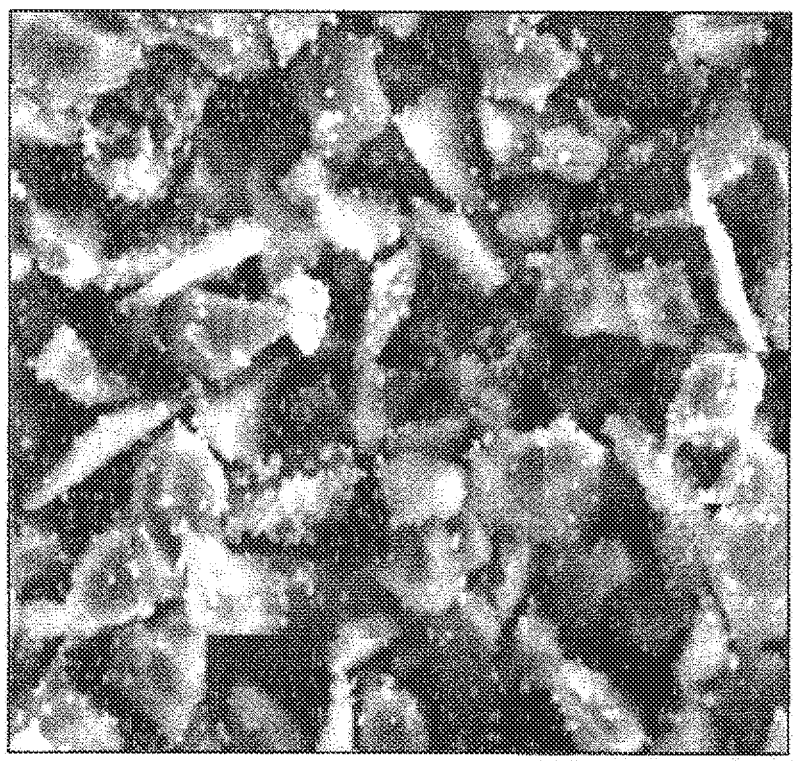
FIG. 2 is an SEM image of anode active material powder manufactured in Example 4 as another embodiment according to the principles of the present invention.

The anode active material was manufactured using the same method as in Embodiment 1 except that the impregnation time with the plating solution was about 10 minutes. A scanning electron microscope image of the manufactured anode active material is shown in FIG. 2.

Content of the plated Ni was about 5 wt % on a basis of a total weight of the anode active material.

Example 5

Figure 3:
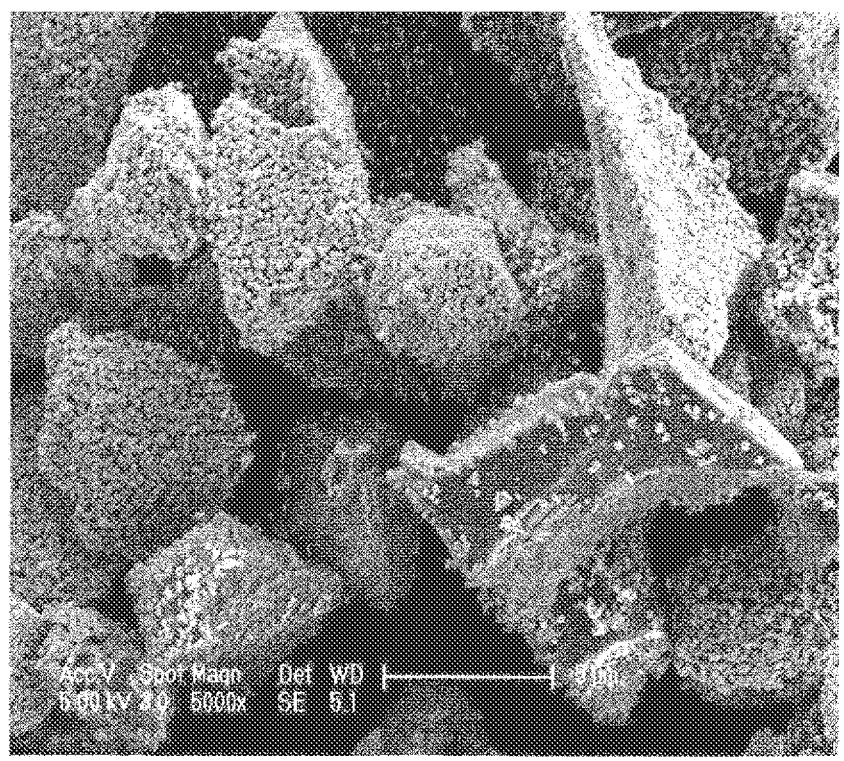
FIG. 3 is an SEM image of anode active material powder manufactured in Example 5 as still another embodiment according to the principles of the present invention.

The anode active material was manufactured using the same method as in Embodiment 1 except that the impregnation time with the plating solution was about 45 minutes. A scanning electron microscope image of the manufactured anode active material is shown in FIG. 3.

Content of the plated Ni was about 29.4 wt % on a basis of a total weight of the anode active material.

Comparative Example 1

$SiO_x$ powder that was not coated with Ni was manufactured using the same method as in Embodiment 1 except that a process of Ni plating was omitted.

Comparative Example 2

Si and $SiO_2$ were mixed at a molar ratio of about 2:1, and then pressed to manufacture a pellet. The pellet was put into a crucible, and heated and vaporized at a temperature of about 1400° C. in an inert atmosphere to educe mixed gas onto a SuS substrate. The educed precipitate was collected and winded to manufacture $SiO_x$ (x=0.95) powder having an average particle diameter (d50) of about 5 μm.

After the power was put into a furnace and a temperature was increased to about 1000° C. in argon atmosphere, mixed gas of argon and methane at a ratio of about 10:2 was supplied at a flow velocity of about 5 sccm for about 5 minutes to manufacture $SiO_x$ powder on a surface of which carbon is coated.

(Manufacturing Anode and Lithium Battery)

Example 6

An anode active material powder synthesized in Example 1 and a carbon conducting agent (Ketjen Black, EC-600JD) were uniformly mixed at a weight ratio of about 80:10, and then a PVDF binder solution was added to manufacture slurry having a weight ratio of about 80:10:10 among the anode active material powder, the carbon conducting agent, and the binder.

The active material slurry was coated on a copper foil having a thickness of about 15 μm, and then dried to manufacture an anode plate. Then, the anode plate was vacuum-dried to manufacture a coin cell having a diameter of about 12 mm.

During manufacturing the coin cell, metal lithium was used as a counter electrode, a polypropylene separator (Cellgard 510) was used as a separator, and 1.3 M $LiPF_6$ melted in a mixed solvent of ethylene carbonate (EC) and diethyl carbonate (DEC) with a volume ratio of about 3:7 was used as an electrolyte.

Examples 7-10

Lithium batteries were manufactured using the same method as in Example 6 except that anode active material powders synthesized in Examples 2 to 5 were respectively used.

Comparative Examples 3 and 4

Lithium batteries were manufactured using the same method as in Example 6 except that anode active material powders prepared in Comparative Examples 1 and 2 were respectively used.

Evaluation Example 1

Ion Coupled Plasma (ICP) Experiment

ICP was measured for anode active materials manufactured in Examples 1 to 5 and Comparative Example 1 to calculate Ni content included in the anode active materials. The Ni content is expressed as a weight percentage on a basis of a total weight of anode active material. Results are shown in Table 1 below.

TABLE 1

|  | Ni content [wt %] |
| --- | --- |
| Embodiment 1 | 9 |
| Embodiment 2 | 11.6 |
| Embodiment 3 | 14.7 |
| Embodiment 4 | 5 |
| Embodiment 5 | 29.4 |
| Comparative Example 1 | 0 |

As shown in Table 1, the anode active materials manufactured in Examples 1 to 5 include Ni as much as about 5 wt % to about 30 wt %.

Evaluation Example 2

Measuring Specific Conductivity

Specific conductivity was measured for anode active materials manufactured in Examples 1 to 5 and Comparative Examples 1 and 2 to evaluate surface conductivity of the anode active materials. Results are shown in Table 2 below.

TABLE 2

|  | Specific conductivity [S/cm] |
|---|---|
| Embodiment 1 | 16 |
| Embodiment 2 | 18 |
| Embodiment 3 | 21 |
| Embodiment 4 | 10 |
| Embodiment 5 | 44 |
| Comparative Example 1 | 0 |
| Comparative Example 2 | 3~4 |

As shown in Table 2, specific conductivity of the anode active materials manufactured in Examples 1 to 5 was improved in comparison with the anode active materials of Comparative Examples 1 and 2.

Evaluation Example 3

Charging/Discharging Characteristics Evaluation

The coin cells manufactured in Examples 6 to 10 and Comparative Examples 3 and 4 were charged and discharged with a constant-current of about 0.2 C rate in the voltage range of about 2.5 V to about 4.1 V at room temperature to measure initial discharge capacity, initial efficiency, and capacity retention. Results are shown in Table 3 below. Capacity retention ratio at room temperature is expressed as Equation 1 below. Charge capacity and discharge capacity in a first cycle are expressed as initial charge capacity and initial discharge capacity. Initial charge/discharge efficiency is expressed as Equation 2 below.

Capacity retention ratio [%]=[discharge capacity in $50^{th}$ cycle/discharge capacity in $1^{st}$ cycle]×100   <Equation 1>

Initial charge/discharge efficiency [%]=discharge capacity in $1^{st}$ cycle/charge capacity in $1^{st}$ cycle   <Equation 2>

TABLE 3

|  | Initial charge capacity [mAh/g] | Initial discharge capacity [mAh/g] | Initial charge/ discharge efficiency [%] | Capacity retention ratio [%] |
|---|---|---|---|---|
| Embodiment 6 | 1980 | 1423 | 72 | 98 |
| Embodiment 7 | 1930 | 1403 | 73 | 96 |
| Embodiment 8 | 1539 | 1137 | 75 | 86 |
| Embodiment 9 | 1783 | 1283 | 69 | 87 |
| Embodiment 10 | 1427 | 865 | 61 | 94 |
| Comparative Example 3 | 1250 | 1020 | 80 | 56 |
| Comparative Example 4 | 1903 | 1370 | 72 | 74 |

As shown in Table 3, life characteristics of lithium batteries of Examples 6 to 10 were remarkably improved in comparison with lithium batteries of Comparative Examples 3 and 4.

According to an aspect, discharge capacity and life characteristics of a lithium battery may be improved by including an anode material which includes a silicon oxide coated with metal unreactive toward lithium.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An anode active material, comprising:
   a core consisting of $SiO_x$, wherein x is greater than or equal to 0.5 and is less than or equal to 1.7; and
   a coating layer formed on the core at least partially,
   the coating layer comprises metal unreactive toward lithium;
   wherein the coating layer is formed on the core in the form of islands;
   wherein the meta unreactive toward lithium is one or more selected from the group consisting of Ni, Cu, Fe, Ti, and Cd, wherein the content of the metal unreactive toward lithium is about 5 wt % to about 30 wt % on the basis of the total weight of the anode active material.

2. The anode active material of claim 1, wherein content of the metal unreactive toward lithium is about 7 wt % to about 15 wt % on a basis of a total weight of the anode active material.

3. The anode active material of claim 1, wherein the coating layer further comprises metal alloyable with lithium.

4. The anode active material of claim 3, wherein the metal alloyable with lithium is one or more selected from a group consisting of Ag, Sn, Al, and an alloy thereof.

5. The anode active material of claim 1, wherein the $SiO_x$, wherein x is greater than or equal to 0.5 and is less than or equal to 1.7, is amorphous or has low crystallinity.

6. The anode active material of claim 1, wherein an average particle diameter (d50) of the anode active material is about 1 µm to about 10 µm.

7. The anode active material of claim 1, wherein specific conductivity of the anode active material is larger than about 5 S/cm.

8. An anode comprising an anode active material of claim 1.

9. A lithium battery comprised of an anode of claim 8.

10. A method of manufacturing an anode active material of claim 1, comprising:
    forming a coating layer comprising metal unreactive toward lithium on $SiO_x$, wherein x is greater than or equal to 0.5 and is less than or equal to 1.7, powder.

11. The method of claim 10, wherein the coating layer is formed by plating.

12. The method of claim 11, wherein the plating is electroless plating.

13. The method of claim 12, wherein the electroless plating is performed by impregnating the $SiO_x$, wherein x is greater than or equal to 0.5 and is less than or equal to 1.7, powder with a plating solution which comprises a precursor of metal unreactive toward lithium.

14. The method of claim 13, wherein the $SiO_x$, wherein x is greater than or equal to 0.5 and is less than or equal to 1.7, powder is impregnated with the plating solution for less than about one hour.

15. The method of claim 13, wherein a catalyst nucleus is formed on a surface of the $SiO_x$, wherein x is greater than or equal to 0.5 and is less than or equal to 1.7, powder before the $SiO_x$, wherein x is greater than or equal to 0.5 and is less than or equal to 1.7, powder is impregnated with the plating solution.

16. The method of claim 10, wherein the precursor of metal unreactive toward lithium is one or more selected from a group consisting of $NiSO_4$, $CuSO_4$, $PdC_{12}$, and $Ti_{O2}$.

17. The method of claim 10, further comprising heat-treating the $SiO_x$, wherein x is greater than or equal to 0.5 and is less than or equal 1.7, powder on which the coating layer is formed.

* * * * *